(12) United States Patent
Park et al.

(10) Patent No.: US 9,899,109 B2
(45) Date of Patent: Feb. 20, 2018

(54) TREATMENT APPARATUS AND METHOD FOR WASTE STEAM GENERATOR, AND INSTALLATION METHOD OF TREATMENT APPARATUS FOR WASTE STEAM GENERATOR

(71) Applicant: DOOSAN HEAVY INDUSTRIES & CONSTRUCTION CO., LTD., Changwon-si, Gyeongsangnam-do (KR)

(72) Inventors: Kwang Soo Park, Changwon-si (KR); Kwang Yong Park, Changwon-si (KR); Seon Ho Lee, Changwon-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 377 days.

(21) Appl. No.: 14/811,920

(22) Filed: Jul. 29, 2015

(65) Prior Publication Data
US 2016/0035445 A1 Feb. 4, 2016

(30) Foreign Application Priority Data

Jul. 30, 2014 (KR) .................. 10-2014-0097528

(51) Int. Cl.
*G21D 1/00* (2006.01)
*B23D 45/12* (2006.01)
(Continued)

(52) U.S. Cl.
CPC ............ *G21D 1/003* (2013.01); *B23D 45/006* (2013.01); *B23D 45/10* (2013.01); *B23D 45/126* (2013.01);
(Continued)

(58) Field of Classification Search
CPC ............ Y10T 83/6587; Y10T 83/6588; Y10T 83/7688; Y10T 83/7684; Y10T 83/7693; B28D 1/088; G21D 1/003; B23D 45/006; B23D 45/10; B23D 45/02; B23D 45/105; B23D 45/12; B23D 45/122; B23D 45/124; B23D 45/126; B23D 53/001; B23D 53/003; B23D 57/0084; B23D 57/0092

See application file for complete search history.

(56) References Cited

U.S. PATENT DOCUMENTS 3,942,248 A * 3/1976 Sherer .................... B23D 21/02
30/103
4,490,909 A * 1/1985 Wachs ................... B23D 21/04
266/56

(Continued)

FOREIGN PATENT DOCUMENTS

JP 2012-168130 A 9/2012
KR 10-1999-0071422 A 9/1990

(Continued)

OTHER PUBLICATIONS

European Office Action in connection wtih a counterpart EP application No. 151789161.1 dated Dec. 23, 2015.

*Primary Examiner* — Phong Nguyen
(74) *Attorney, Agent, or Firm* — Sughrue Mion, PLLC

(57) ABSTRACT

Disclosed herein are a treatment apparatus and method for a waste steam generator, and an installation method of a treatment apparatus for a waste steam generator. The treatment apparatus includes a cutting part for cutting a body of a waste steam generator, a driving part for driving the cutting part, and a support frame for supporting the cutting part and the driving part, wherein the support frame is coupled to an outer peripheral surface of the body of the waste steam generator in a divided state, and the cutting part is driven and cuts the body in a state in which the support frame is coupled to the outer peripheral surface of the body. Consequently, since the treatment apparatus is easily moved and installed, an installation time of the treatment apparatus may be shortened and an exposure time of a worker can be reduced.

16 Claims, 9 Drawing Sheets

(51) Int. Cl.
    *B23D 53/00*     (2006.01)
    *B23D 57/00*     (2006.01)
    *B28D 1/08*     (2006.01)
    *B23D 45/00*     (2006.01)
    *B23D 45/10*     (2006.01)

(52) U.S. Cl.
    CPC ....... *B23D 53/001* (2013.01); *B23D 57/0084* (2013.01); *B28D 1/088* (2013.01)

(56) References Cited

U.S. PATENT DOCUMENTS

| | | |
|---|---|---|
| 5,329,562 A | 7/1994 | Kubo et al. |
| 2004/0231654 A1 | 11/2004 | Parsells et al. |
| 2006/0053998 A1 | 3/2006 | Makkonen et al. |
| 2012/0117959 A1 | 5/2012 | Lewkoski |
| 2014/0109740 A1 | 4/2014 | Shae et al. |

FOREIGN PATENT DOCUMENTS

| | | |
|---|---|---|
| KR | 100815850 B1 | 3/2008 |
| KR | 100971168 B1 | 7/2010 |
| KR | 20100100536 A | 9/2010 |
| KR | 20110050951 A | 5/2011 |
| NL | 8403428 A | 6/1986 |

\* cited by examiner

TREATMENT APPARATUS AND METHOD FOR WASTE STEAM GENERATOR, AND INSTALLATION METHOD OF TREATMENT APPARATUS FOR WASTE STEAM GENERATOR

CROSS-REFERENCE TO RELATED APPLICATIONS

This application claims priority to Korean Patent Application No. 10-2014-0097528, filed on Jul. 30, 2014, the disclosure of which is incorporated herein by reference in its entirety.

BACKGROUND

Field

Exemplary embodiments of the present invention relate to a treatment apparatus and method for a waste steam generator, and an installation method of a treatment apparatus for a waste steam generator, and more particularly, to a treatment apparatus and method for a waste steam generator, and an installation method of a treatment apparatus for a waste steam generator, in which the treatment apparatus is able to be installed within a short time so as to minimize an exposure time of a worker and a generation amount of secondary wastes.

Description of the Related Art

In general, a steam generator used in a nuclear power plant has a limited life. Accordingly, when the life of the steam generator comes to an end, the steam generator is replaced and stored in a temporary storage facility in order to improve operation efficiency and safety of the nuclear power plant.

In this case, since the steam generator corresponds to a large waste having a weight of about 300 tons and a volume of about 400 m$^3$, a very large storage space for temporarily storing the steam generator is required. However, the steam generator has a part which is contaminated with radioactive contaminants and a part which is slightly contaminated or easily decontaminated. The significant parts of the steam generator are converted into wastes exempted from regulations through proper methods such as decontamination, cutting, and waste processing. Consequently, an amount of final wastes for disposal may be reduced.

To this end, it is necessary that a waste steam generator is cut using cutting equipment made by enlarging a band saw device disclosed in Korean Patent Laid-open Publication No. 2010-0100536 to be divided into a radioactive contaminated section and a non-contaminated section.

The work of cutting the waste steam generator should be performed such that carbon steel having a diameter of 4300 mm or more and a thickness of 150 mm or more is cut while an inner structure contaminated with radioactive contaminants is not damaged. However, since the above-mentioned band saw device has a structure in which a band saw cuts an object while rotating and circulating, the band saw has an increased size of rotation circulation structure as the size of the object is increased. For this reason, there is a limit to enlarge the cutting device.

In addition, when the waste steam generator is cut using the conventional band saw cutting device, it takes a long time to install the cutting device and cut the waste steam generator. Therefore, there is a problem in that a time for which a worker is exposed to radioactivity becomes longer.

RELATED ART DOCUMENT

[Patent Document 1] Korean Patent Laid-open Publication No. 2010-0100536 (Sep. 15, 2010)

SUMMARY

An object of the present invention is to provide a treatment apparatus and method for a waste steam generator, and an installation method of a treatment apparatus for a waste steam generator, in which the treatment apparatus is able to be installed within a short time so as to minimize an exposure time of a worker and a generation amount of secondary wastes and shorten a process time.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a treatment apparatus for a waste steam generator includes a cutting part for cutting a body of a waste steam generator, a driving part for driving the cutting part, and a support frame for supporting the cutting part and the driving part, wherein the support frame is coupled to an outer peripheral surface of the body of the waste steam generator in a divided state, and the cutting part is driven and cuts the body in a state in which the support frame is coupled to the outer peripheral surface of the body.

The support frame may be divided into a plurality of portions, and may include a coupling part for mutually coupling the divided support frames in a state in which the divided support frames are coupled to the cylindrical outer peripheral surface of the body.

The support frame may be divided into four portions, and the four divided support frames may be coupled to the outer peripheral surface of the body in four directions.

The support frame may include a main frame having a cylindrical shape in a state in which the support frame is coupled to the outer peripheral surface of the body, a rotation frame rotatably coupled to one surface of the main frame so that the cutting part and the driving part are mounted to the rotation frame, and a frame driving part for rotatably driving the rotation frame.

The cutting part may be provided in plural numbers and be a circular cutter having a circular saw.

The plurality of cutting parts may be spaced apart from each other, and other cutting parts may repeatedly pass along a path along which one cutting part passes.

Each of the cutting parts may include a first cutter and a second cutter, and the first and second cutters may be installed so as to have the same central axis and such that surfaces of the respective first and second cutters face each other and sides of cutting paths of the respective first and second cutters overlap with each other.

Each of the cutting parts may include first and second cutters having the same cutting path, and the second cutter may repeatedly pass along the cutting path along which the first cutter passes.

The first cutter may have a smaller cutting width (t) than a cutting width (t1) of the second cutter, and the first and second cutters may have the same cutting depth.

The first cutter may have a greater cutting width (t) than a cutting width (t1) of the second cutter, the first cutter may have a cutting depth from the outer peripheral surface of the body to a preset cutting depth (H), and the second cutter may have a cutting depth from the preset cutting depth (H) to an inner peripheral surface of the body.

The driving part may drive the cutting part in a first direction in which the cutting rotates, in a second direction in which the cutting part is moved toward the outer peripheral surface of the body, and in a third direction in which the cutting part is spaced apart from the body.

The treatment apparatus may further include an electric supply module for supplying electric power to the driving part and the frame driving part, the electric supply module may include an electric power supply rail coupled to the other surface of the main frame, a rail connection part maintained and rotated in a state of coming into contact with the electric power supply rail when the rotation frame is stopped and rotated, and a connection part connecting the rail connection part to the rotation frame, and the driving part and the frame driving part may be electrically connected to the electric supply module through the rotation frame.

The rotation frame may be infinitely rotated when the electric power is supplied thereto through the electric supply module, and the driving part and the frame driving part may be controlled in a wireless manner.

The treatment apparatus may further include an injection unit installed on the rotation frame, and the injection unit may include an injection nozzle for spraying cutting oil in a mist form, a pressure supply part supplied with the electric power from the electric supply module so as to provide an injection pressure of the cutting oil, and an oil tank for storing the cutting oil.

The treatment apparatus may further include a movable installation jig which supports the support frame at a lower portion and is separated when the support frame is moved and then coupled to the body.

In accordance with another aspect of the present invention, a treatment method for a waste steam generator includes applying electric power from an external electric source, supplying the applied electric power to a driving part for driving a cutting part and a frame driving part for driving a rotation frame through an electric supply module, and driving the cutting part mounted to the rotation frame in a state in which the rotation frame rotates to cut a body of a waste steam generator.

The driving part and the frame driving part may be controlled in a wireless manner by an external control center.

In accordance with a further aspect of the present invention, an installation method of a treatment apparatus for a waste steam generator includes transferring a plurality of divided support frames such that the divided support frames are adjacent to a body of a waste steam generator, installing the divided support frames onto an outer peripheral surface of the body of the waste steam generator, coupling the divided support frames to each other so as to be one cylindrical support frame by interconnecting the divided support frames, and connecting an electric supply module to an external electric source in a state in which the support frames are coupled to each other.

The divided support frames may be four support frames, two of the four support frames may be coupled toward the outer peripheral surface of the body from an upper portion of the body, and the other two may be coupled toward the outer peripheral surface of the body from a lower portion of the body.

The divided support frames may be transferred by an installation jig, and the installation jig may be separated after the support frames are connected to each other so as to be one support frame.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
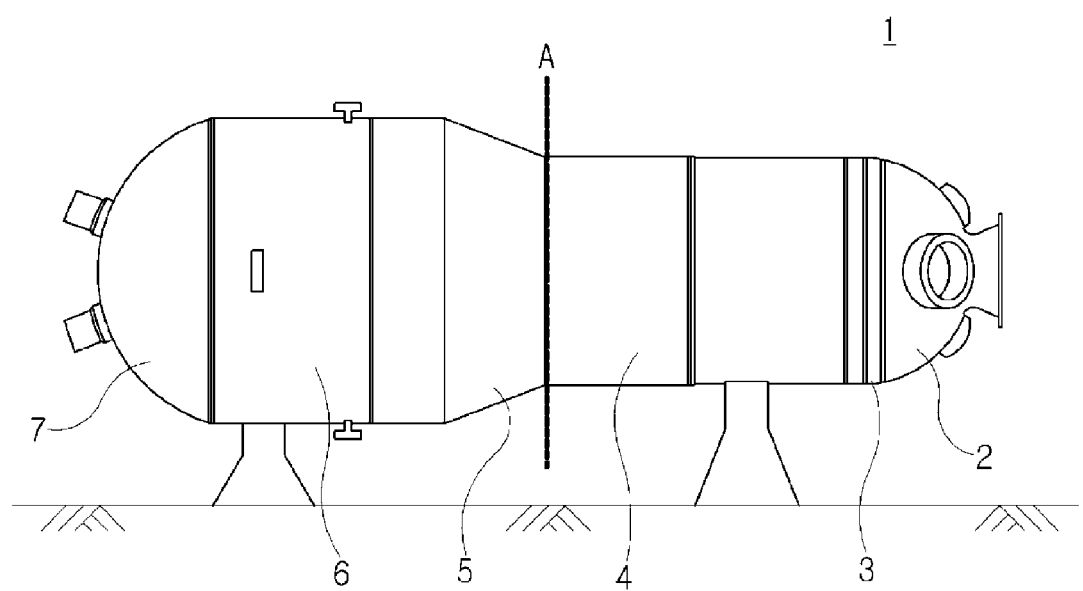
FIG. 1 is a side view illustrating a typical waste steam generator.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments. Hereinafter, a treatment apparatus for a waste steam generator according to an embodiment of the present invention will be described in detail with reference to the drawings.

FIG. 1 is a side view illustrating a typical waste steam generator.

As illustrated in FIG. 1, the typical waste steam generator is an apparatus which serves to receive high-temperature and high-pressure coolant heated by a reactor core and to convert supplied water into steam. The waste steam generator includes a bundle of heat transfer pipes and a body 1 surrounding the same. The body is made of carbon alloy steel and an inner portion thereof is coated with stainless steel for prevention of rust. The body includes a domed lower head 2, a tube plate 3, a lower cylinder 4, a conical conversion part 5, an upper cylinder 6, and an upper head 7.

The body 1 of the waste steam generator is generally treated at a cutting position A. On the basis of the cutting position A, a portion of the lower head 2 is a non-contaminated structure which is not contaminated with radioactive substances or has a very low contamination level and a portion of the upper head 7 is a contaminated structure which is contaminated with radioactive substances. The treatment apparatus for a waste steam generator, which is designated by reference numeral 10, first cuts a portion at the cutting position A on the basis of the cutting position A and then cuts an entire portion of the body 1 in front of the lower head 2 to a plurality of portions, so as to reduce the size of an object to be treated.

Figure 2:
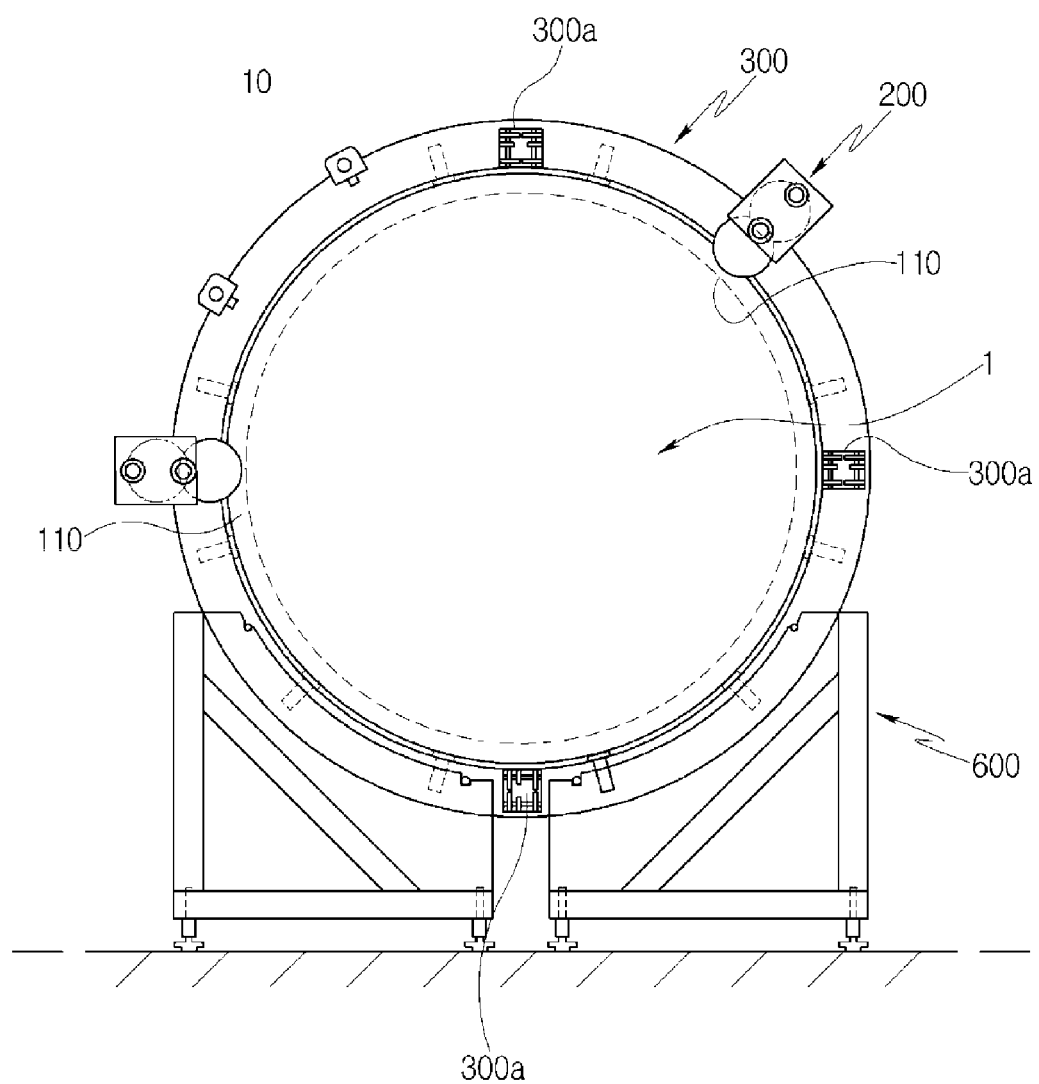
FIG. 2 is a front view illustrating a treatment apparatus for a waste steam generator according to an embodiment of the present invention.
Figure 3:
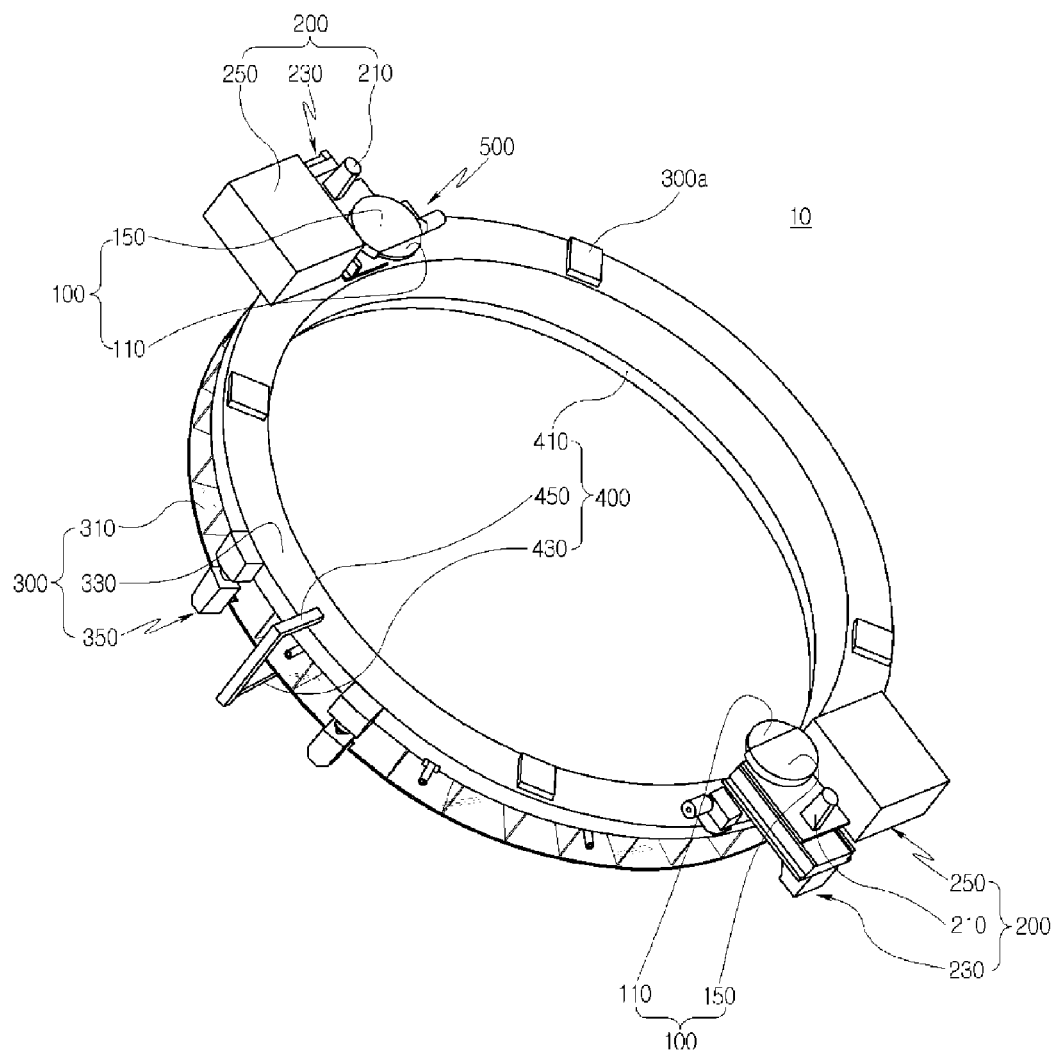
FIG. 3 is a perspective view illustrating the treatment apparatus for a waste steam generator according to the embodiment of the present invention.
Figure 4:
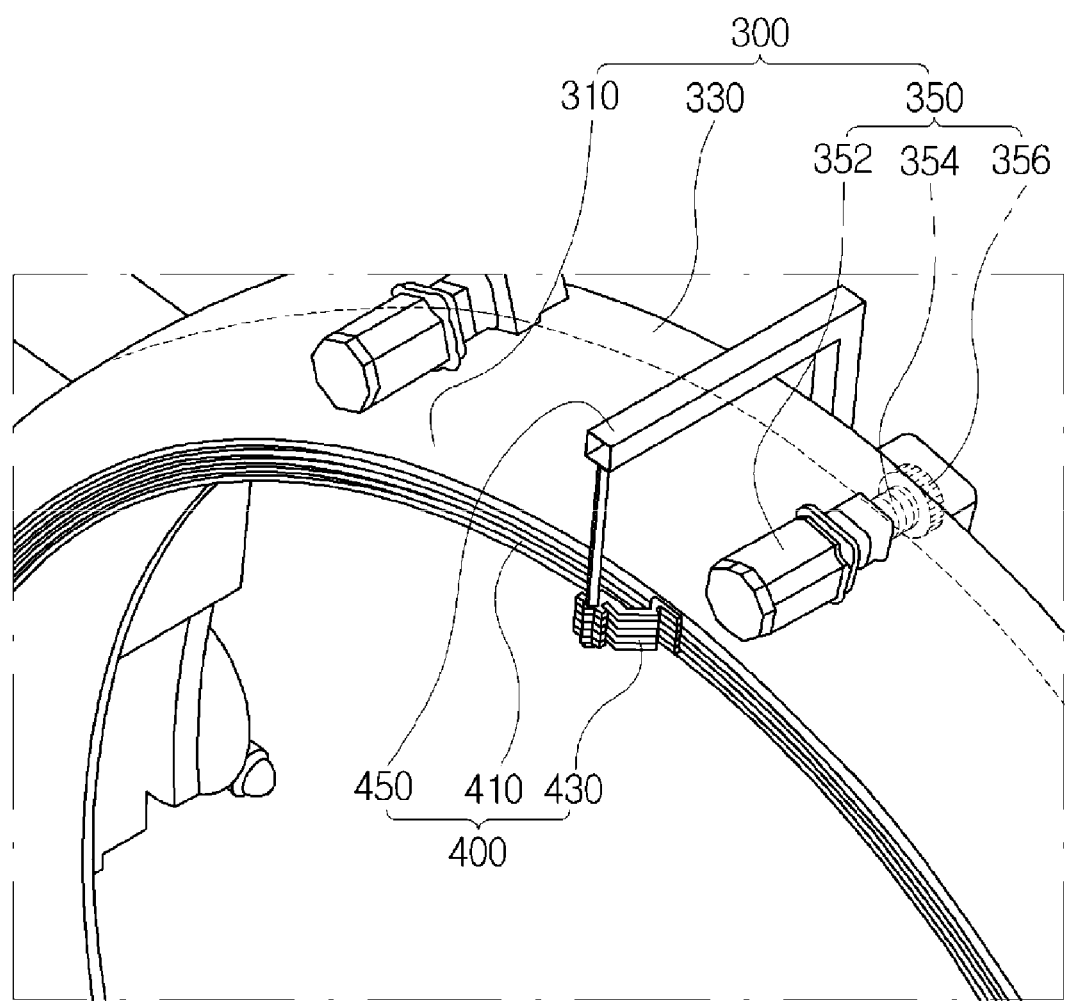
FIG. 4 is a perspective view illustrating an electric supply module of the treatment apparatus for a waste steam generator according to the embodiment of the present invention.
Figure 5:
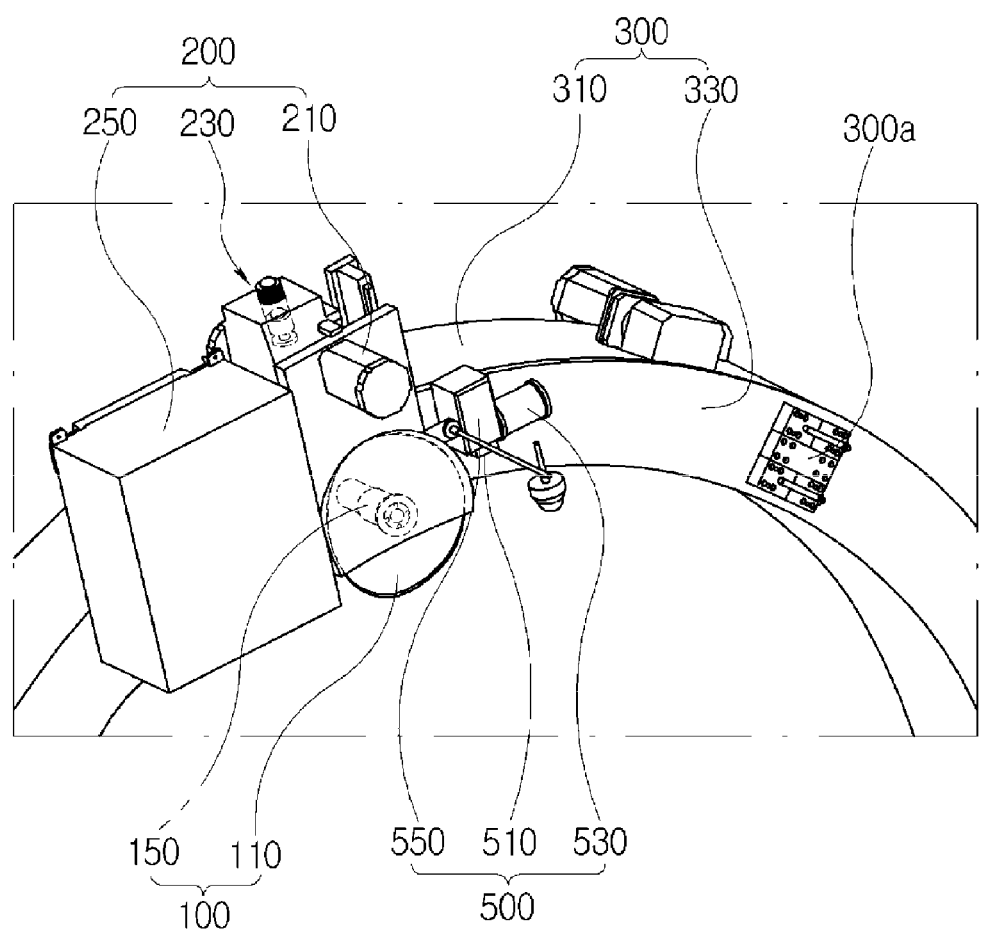
FIG. 5 is a front perspective view illustrating a cutting module of the treatment apparatus for a waste steam generator according to the embodiment of the present invention.
Figure 6:
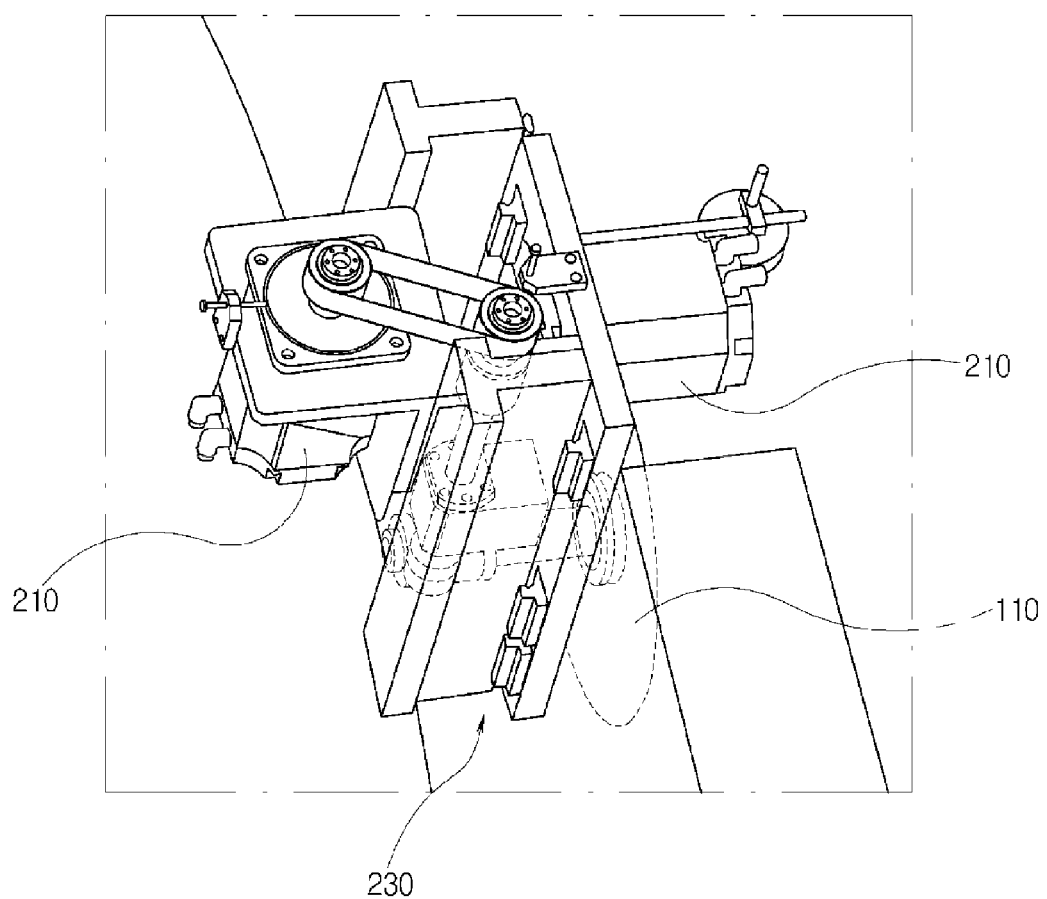
FIG. 6 is a rear perspective view illustrating the cutting module of FIG. 4.

FIG. 2 is a front view illustrating a treatment apparatus for a waste steam generator according to an embodiment of the present invention. FIG. 3 is a perspective view illustrating the treatment apparatus for a waste steam generator according to the embodiment of the present invention. FIG. 4 is a perspective view illustrating an electric supply module of the treatment apparatus for a waste steam generator according to the embodiment of the present invention. FIG. 5 is a front perspective view illustrating a cutting module of the treatment apparatus for a waste steam generator according to the embodiment of the present invention. FIG. 6 is a rear perspective view illustrating the cutting module of FIG. 4.

As illustrated in FIGS. 2 to 6, the treatment apparatus for a waste steam generator 10 includes a cutting part 100 for cutting the body 1 of the waste steam generator, a driving part 200 for driving the cutting part 100, a support frame 300 for supporting the cutting part 100 and the driving part 200, and an electric supply module 400 for supplying electric power to the treatment apparatus for a waste steam generator 10. The support frame 300 is movably supported by an installation jig 600.

The support frame 300 and the electric supply module 400 for electric power supply will be first described.

The support frame 300 is divided into a plurality of portions, and preferably may be divided into four portions for easy installation. Since the waste steam generator corresponds to a large waste, a circular treatment apparatus should have a large size when the waste steam generator is cut using the same. In addition, since the support frame requires a long time to be moved near the body and coupled thereto, an exposure time of a worker is increased. The support frame 300 may also be divided into two portions. However, it is difficult to significantly shorten movement and coupling times of the two support frames since the size of the two support frames is increased compared to that of the four support frames. Thus, the support frame 300 is most preferably divided into four portions in order to decrease the size of the support frame and mount the support frame onto an outer peripheral surface of the cylindrical body 1 within a short time.

The support frame 300 may have a circular inner peripheral surface corresponding to the shape of the outer peripheral surface of the body 1 in a state in which the divided support frames are integrally coupled to each other, and an outer peripheral surface having a circular shape or any shape instead of the circular shape. In a state in which the support frame 300 is divided into a plurality of portions, a coupling part 300a is provided at each end of the divided support frames, and the divided support frames are integrally coupled to each other by the coupling parts 300a for formation of one support frame. In this case, the divided support frames 300 are moved by the installation jig 600 in the integrally coupled state and are then decoupled to be coupled to the body 1 of the waste steam generator again. Alternatively, two upper pieces of the divided support frames 300 may be moved by a crane while two lower pieces are moved by the installation jig 600 or the divided support frames may be moved by the installation jig 600 in the state of being respectively decoupled from each other, with the consequence that the support frames may be coupled to the body 1 of the waste steam generator.

The support frame 300 includes a main frame 310 having a cylindrical shape in a state in which the support frame is coupled to the outer peripheral surface of the body 1, a rotation frame 330 rotatably coupled to one surface of the main frame 310 so that the cutting part 100 and the driving part 200 are mounted to the rotation frame 330 in a state in which the main frame 310 is coupled to the rotation frame 330, and a frame driving part 350 for rotatably driving the rotation frame 330.

All of the main frame 310 and the rotation frame 330 are divided into a plurality of portions, and the divided main frames 310 and rotation frames 330 are modularized and moved in the coupled state. In addition, a plurality of cutting parts 100, driving parts 200, and frame driving parts 350 is individually installed on the modularized main frame 310 and rotation frame 330. The rotation frame 330 rotates relative to the main frame 310 connected in a circular form in the state in which the support frame is coupled to the outer peripheral surface of the body 1 of the waste steam generator. Coupling portions of the main frames are preferably formed so as not to disturb rotation of the rotation frame 330 such that the rotation frame 330 may smoothly rotate in a state in which the main frames 310 are integrally coupled to each other. The main frame 310 is electrically connected to the electric supply module 400, and the rotation frame 330 rotates by receiving electric power from the electric supply module 400 through the main frame 310. The rotation frame 330 infinitely rotates until the supply of electric power is stopped.

The frame driving part 350 includes a motor 352 which provides driving force for rotating the rotation frame 330 to the rotation frame 330, a first gear part 354 coupled to the motor 352 for transferring torque of the motor 352, and a second gear part 356 engaged with the first gear part 354. The second gear part 356 is integrally formed on an outer peripheral surface of the rotation frame 330 or is coupled along the outer peripheral surface of the rotation frame 330. The motor 352 may be provided as one motor or a plurality of motors as occasion demands. The motor 352 is supplied with electric power from the electric supply module 400 through the main frame 310, and is controlled in a wireless manner. It is preferable that a control center is provided in a separate place spaced apart from the treatment apparatus for a waste steam generator 10 in order to minimize an exposure time of a worker and an influence by radioactivity and all except for electric power supply are controlled in a wireless manner.

The electric supply module 400 includes an electric power supply rail 410 installed on the other surface of the main frame 310, namely, at an opposite side of an installation surface of the rotation frame 330, a rail connection part 430 maintained in a state of always coming into contact with the electric power supply rail 410, and a connection part 450 which connects the rail connection part 430 to the rotation frame 330 (hereinafter, it is defined that a direction directed to the rotation frame is referred to as "front" and an opposite direction thereof is referred to as "rear", for convenience sake).

The electric power supply rail 410 is coupled to the rear of the main frame 310 in a circular form and is connected to an external electric source (not shown) such that electric power is supplied to the driving part 200, the frame driving part 350, and an injection unit 500. The electric power supply rail 410 is preferably installed such that a predetermined spaced gap is formed between the electric power supply rail 410 and the main frame 310, and may be connected to the external electric source through the spaced gap. Accordingly, the electric power supply rail 410 may be maintained in a connected state with the external electric source while having no influence on rotation motion of the rail connection part 430.

One end of the rail connection part 430 comes into contact with the electric power supply rail 410 and the other end thereof is coupled to the connection part 450. Accordingly, the connection part 450 rotates the rail connection part 430 while rotating relative to the rotation frame 330. The rail connection part 430 is preferably maintained in a state of being always connected to the electric power supply rail 410, regardless of a stop or rotation state of the rotation frame 330.

The connection part 450 has a "i" shape so as not to strike the frame driving part 350 and the like when rotating by the rotation frame 330 while does not disturb rotation of the rotation frame 330. One end of the connection part 450 having the "i" shape is coupled to the rail connection part 430 and the other end thereof is coupled to the front of the rotation frame 330. However, the connection part 450 may have another shape instead of the "i" shape as long as rotation of the connection part 450 is not disturbed due to the shape thereof. In addition, the connection part 450 is preferably installed at a position spaced apart from the cutting part 100 by a predetermined distance so as not to disturb the operation of the cutting part 100 to be described later.

Hereinafter, various shapes of the cutting part and the driving part for driving the cutting part of the treatment apparatus for a waste steam generator 10 according to the embodiment of the present invention will be described with reference to FIGS. 5 to 9.

The cutting part 100 is provided in plural numbers to be installed on the rotation frame 330. Each cutting part 100 may be a circular cutter having a circular cutting blade such as a circular saw. The cutting part 100 cuts the body 1 of the waste steam generator by rotation of the circular blade having a predetermined thickness, and fully cuts the body 1 from the outer peripheral surface thereof to the inner peripheral surface thereof. The cutting parts 100 are spaced apart from each other. Other cutting parts repeatedly pass along a path along which one cutting part passes, and all or a portion of cutting paths of the other cutting parts overlap(s) with a cutting path along which any cutting part passes previously. This allows friction force and resistance force generated during the cutting process to be minimized. Each cutting part 100 may be configured of cutters 110 and 130 and a cutter coupling part 150.

Each of first and second cutters 110 and 130 is a circular cutting blade, and the first and second cutters 110 and 130 are coupled to the rotation frame 330 in a state of being stored in the cutter coupling part 150. The cutter coupling part 150 is fixed to the rotation frame 330, and the first and second cutters 110 and 130 are rotatably coupled to the cutter coupling part 150. The rotation frame 330 rotates along with rotation of the first and second cutters 110 and 130.

Figure 7:
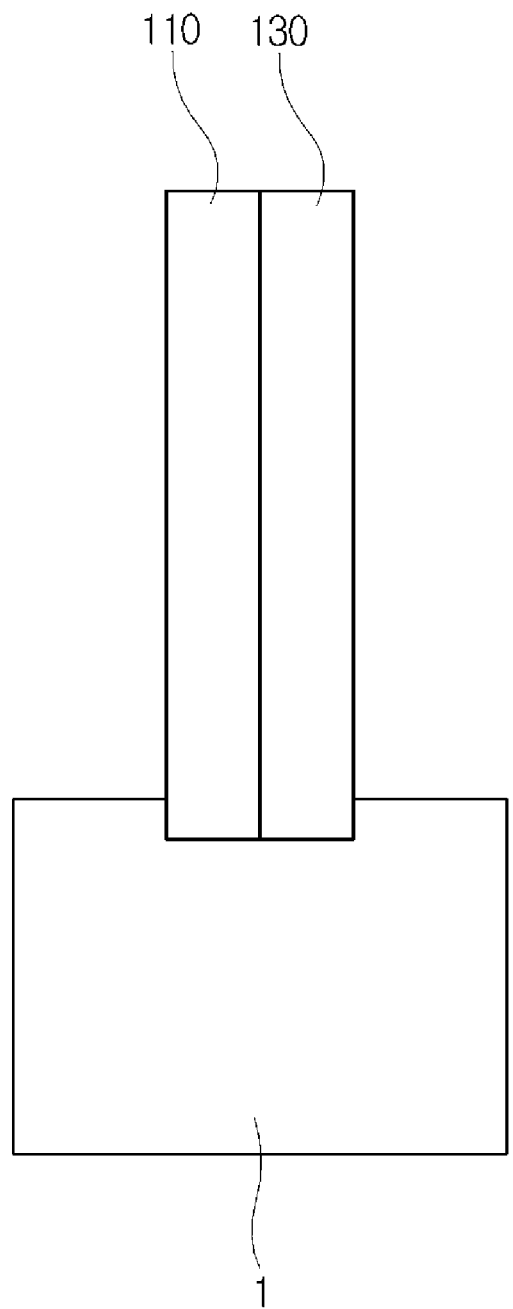
FIG. 7 is a view schematically illustrating a first example of the cutting module of the treatment apparatus for a waste steam generator according to the embodiment of the present invention.

As illustrated in FIG. 7, the first and second cutters 110 and 130 may be installed so as to have the same central axis and such that surfaces of the respective first and second cutters 110 and 130 face each other and cutting paths thereof are in parallel with each other or sides of the respective cutting paths overlap with each other. That is, the first and second cutters 110 and 130 are installed so as to be located on different central lines while having the same central axis. When the cutting paths of the first and second cutters 110 and 130 are in parallel with each other or the sides of the respective cutting paths overlap with each other, the second cutter 130 passes along the path along which the first cutter 110 passes. Thereby, since friction force and resistance force are applied to one side surface of the second cutter 130 when the body 1 is cut, a cutting time may be shortened and damage of the cutters may be reduced. In addition, since the first cutter 110 also passes along the path along which the second cutter 130 passes, friction force and resistance force applied to the first cutter 110 when the body 1 is cut may be reduced. The first and second cutters 110 and 130 cut the body 1 while infinitely rotating. When the body 1 is cut by a predetermined depth, a cutting depth of the body 1 is adjusted so that the first and second cutters 110 and 130 fully cut the body 1 from the outer peripheral surface thereof to the inner peripheral surface thereof by consistently cutting the body 1. The cutting depth may be adjusted according to a cut portion of the body 1.

Figure 8:
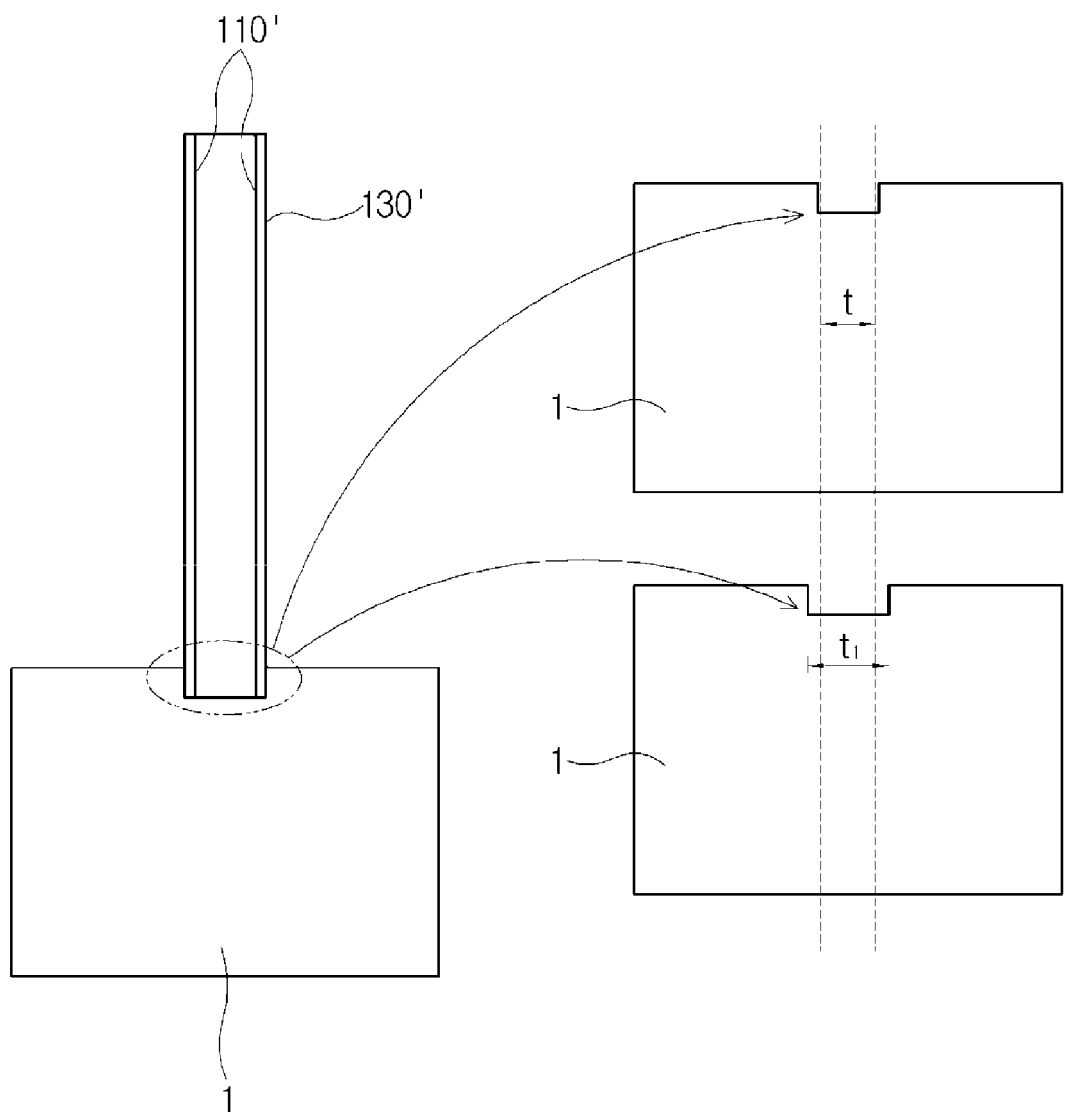
FIG. 8 is a view schematically illustrating a second example of the cutting module of the treatment apparatus for a waste steam generator according to the embodiment of the present invention.

Alternatively, as illustrated in FIG. 8, first and second cutters 110' and 130' may be installed so as to be located on the same central line while having the same central axis, so that cutting paths of the first and second cutters 110' and 130' overlap with each other. In this case, the first cutter 110' may have a smaller cutting width t than a cutting width $t_1$ of the second cutter 130'. That is, the second cutter 130' may have a larger thickness than that of the first cutter 110'. In this case, since the second cutter 130' repeatedly passes along the path along which the first cutter 110' passes, the cutting work is completed when the second cutter additionally cuts the body 1 by only a width of $t_1-t$. Therefore, friction force and resistance force applied to the cutter when the body 1 is cut may be minimized. The first and second cutters 110' and 130' cut the body 1 while infinitely rotating. When the body 1 is cut by a predetermined depth, a cutting depth of the body 1 is adjusted so that the first and second cutters 110' and 130' fully cut the body 1 from the outer peripheral surface thereof to the inner peripheral surface thereof by consistently cutting the body 1. The cutting depth may be adjusted according to a cut portion of the body 1.

Figure 9:
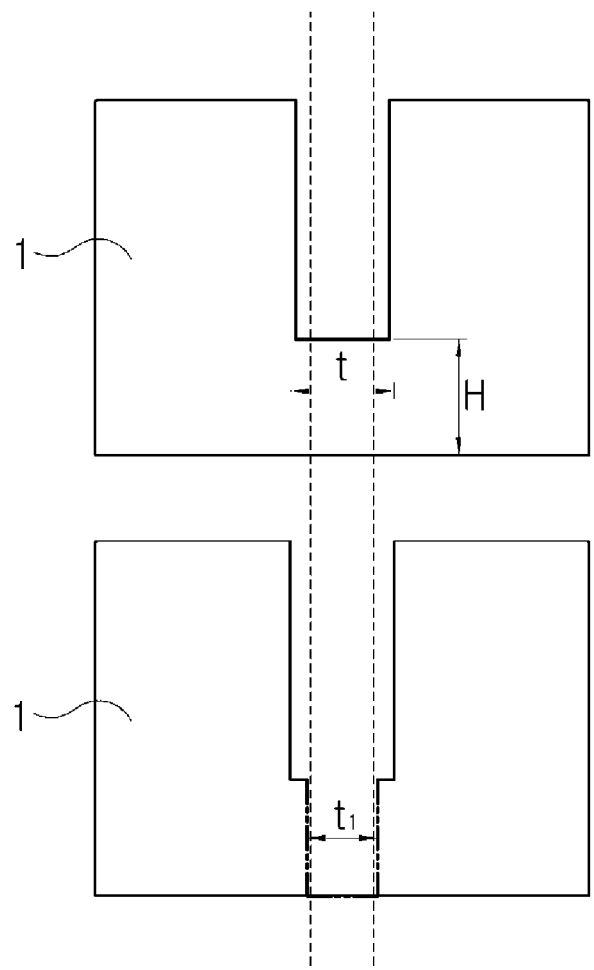
FIG. 9 is a view schematically illustrating a third example of the cutting module of the treatment apparatus for a waste steam generator according to the embodiment of the present invention.

Meanwhile, as illustrated in FIG. 9, the first and second cutters 110 and 130 (not shown) may be installed so as to be located on the same central line while having different central axes. That is, the first and second cutters 110 and 130 are installed so as to have the same cutting path and different cutting depths. In this case, the first cutter 110 may have a greater cutting width t than a cutting width $t_1$ of the second cutter 130, the first cutter 110 has a cutting depth from the outer peripheral surface of the body 1 to reference numeral H, and the second cutter 130 has a cutting depth from reference numeral H to the inner peripheral surface of the body 1. Here, the reference numeral H refers to a preset cutting depth, and may be set to be a half or one-third point of the thickness of the body 1 of the waste steam generator. The cutting depths of the first and second cutters 110 and 130 may be changed according to the set cutting depth. In this case, the first cutter 110 cuts the body 1 from the outer peripheral surface thereof to the cutting depth indicated by reference numeral H, and the second cutter 130 cuts the body 1 from the reference numeral H to the inner peripheral surface thereof along the cutting path along which the first cutter 110 passes. Since the first cutter 110 cuts only a portion of the thickness of the body 1, friction force and resistance force applied to the cutter when the body 1 is cut may be minimized. Since the second cutter 130 also cuts only a portion of the thickness of the body 1 by a smaller width than the first cutter 110, friction force and resistance force applied to the cutter when the body 1 is cut may be minimized.

The driving part 200 rotates the first and second cutters 110 and 130, and drives the first and second cutters 110 and 130 in various directions in order to adjust the cutting depths of the first and second cutters 110 and 130. That is, the driving part 200 rotates the first and second cutters 110 and 130 in a first direction, and moves the first and second cutters 110 and 130 in a second direction in which the first and second cutters 110 and 130 approach the body 1 and in a third direction in which the first and second cutters 110 and 130 are spaced apart from the body 1. To this end, the driving part 200 includes a plurality of motors 210, a gear set 230 for transferring driving force of each motor 210 to the first and second cutters 110 and 130, and a control module 250 for controlling the first and second cutters 110 and 130 according to external control commands.

Meanwhile, as illustrated in FIG. 5, the treatment apparatus for a waste steam generator 10 according to the embodiment of the present invention includes an injection unit 500 which sprays cutting oil in order to reduce frictional heat generated when the body 1 is cut.

The injection unit 500 includes an injection nozzle 510 for spraying the cutting oil, a pressure supply part 530 for providing an injection pressure, and an oil tank 550 for storing the cutting oil. The injection unit 500 may be connected to the control module 250 such that an injection amount and an injection time are controlled by external control signals.

The injection nozzle 510 sprays the cutting oil in a mist form, and may maintain an effect of reducing a use amount of cutting oil and frictional heat due to cutting. Thus, an amount of secondary wastes in which foreign substances such as metal powders generated when the body 1 is cut are mixed with cutting oil may be minimized. The pressure supply part 530 may be a small compressor, and provides an injection pressure such that the cutting oil may be sprayed as fine particles in a mist form by receiving electric power from the electric supply module 400.

In the treatment apparatus for a waste steam generator according to the embodiment of the present invention having the above-mentioned configuration, a treatment method for a waste steam generator according to control flow and an installation method of a treatment apparatus for a waste steam generator will be described below.

First, the treatment apparatus for a waste steam generator 10 is moved into the temporary storage facility in which the waste steam generator is stored. In this case, the treatment apparatus for a waste steam generator 10 is transferred by the installation jig 600. The transferred treatment apparatus for a waste steam generator 10 is moved near the body 1 of the waste steam generator in a divided state of the support frame, and is moved toward the outer peripheral surface of the body 1 in a state in which the support frame is divided into two upper pieces and two lower pieces. After the treatment apparatus for a waste steam generator 10 is installed to the outer peripheral surface of the body 1, the divided support frames are coupled to each other by interconnecting the coupling parts 300*a* to be one support frame 300. Subsequently, electric power supply is applied from the control center located at a position spaced apart from the temporary storage facility to keep a safe distance away therefrom after the installation jig 600 is removed, and electric power is supplied to the electric supply module 400 of the treatment apparatus for a waste steam generator when the electric power supply is applied thereto.

The electric power supply rail 410 of the electric supply module 400 is connected to the external electric source to be supplied with the electric power. The electric power is supplied to the driving part 200 and the frame driving part 350 by the rail connection part 430 continuously connected to the electric power supply rail 410 and the connection part 450 connected to the rail connection part 430 and the main frame 310.

The control center previously sets a cutting width, a cutting depth, a time required for cutting, and the like of the cutting part 100 according to the size and thickness of the body 1 of the waste steam generator to be treated and transmits control signals to the control module 250. The first and second cutters 110 and 130 are set by the control module 250 according to the transmitted control signals, and the driving part 200 and the frame driving part 350 are operated.

The rotation frame 330 rotates by the operation of the frame driving part 350, and the cutting part 100 and driving part 200 mounted on the rotation frame 330 rotate together. The cutting part 100 cuts the body 1 while moving along the outer peripheral surface of the body 1 along with the rotation of the rotation frame 330. The cutting oil is sprayed in the mist form through the injection unit 500 at a proper timing when the body 1 is cut, thereby allowing secondary contaminants and frictional heat generated by friction during cutting to be minimized. The injection timing of the cutting oil is also set by the control module 250 according to the control signals transmitted from the control center.

When a portion of the body 1 is cut, the treatment apparatus 1 is moved to a next portion of the body 1 using an automatic transfer device and then cuts remaining portions of the body 1. When the cutting of the body 1 is completed, the support frame 300 is disassembled again and the treatment apparatus is removed using the installation jig 600. The worker enters the temporary storage facility only during transfer, installation, and removal of the treatment apparatus, and all processes until the electric power supply is applied to the treatment apparatus and then the cutting work of the body 1 is completed are controlled in a wireless manner. In addition, since the treatment apparatus for a waste steam generator is transferred and installed within a short time in the state in which the support frame is divided into the plurality of portions, the exposure time of the worker can be reduced.

As is apparent from the above description, in accordance with a treatment apparatus and method for a waste steam generator, and an installation method of a treatment apparatus for a waste steam generator, a support frame is divided into a plurality of portions and a dedicated installation jig is provided in the treatment apparatus. Consequently, since the treatment apparatus is easily moved and installed, an installation time of the treatment apparatus can be shortened and an exposure time of a worker can be reduced.

In addition, a cutting position and depth can be precisely controlled to minimize an amount of secondary wastes generated in a cutting process and shorten a time required for the cutting process.

While the present invention has been described with respect to the specific embodiments, it will be apparent to those skilled in the art that various changes and modifications may be made without departing from the spirit and scope of the invention as defined in the following claims.

What is claimed is:

1. A treatment apparatus for a waste steam generator, comprising:
   a cutting part for cutting a body of a waste steam generator;
   a driving part for driving the cutting part;
   a support frame for supporting the cutting part and the driving part,
      wherein the support frame is coupled to an outer peripheral surface of the body of the waste steam generator in a divided state, and the cutting part is driven and cuts the body in a state in which the support frame is coupled to the outer peripheral surface of the body, wherein the support frame comprises a plurality of divided portions, and the treatment apparatus comprises a coupling part for mutually coupling the plurality of divided portions in a state in which the plurality of divided portions are coupled to the cylindrical outer peripheral surface of the body in four locations, wherein the support frame comprises a main frame having a cylindrical shape in a state in which the support frame is coupled to the outer peripheral surface of the body, a rotation frame rotatably coupled to one surface of the main frame so that the cutting part and the driving part are mounted to the rotation frame, and a frame driving part for rotatably driving the rotation frame; and
   an electric supply module for supplying electric power to the driving part and the frame driving part, the electric supply module comprises an electric power supply rail coupled to the other surface of the main frame, a rail connection part maintained and rotated in a state of coming into contact with the electric power supply rail when the rotation frame is stopped and rotated, and a connection part connecting the rail connection part to the rotation frame, and the driving part and the frame driving part are electrically connected to the electric supply module through the rotation frame.

2. The treatment apparatus according to claim 1, wherein the support frame is divided into four portions, and the four portions are coupled to the outer peripheral surface of the body in the four locations.

3. The treatment apparatus according to claim 1, wherein the cutting part is provided in plural numbers and is a circular cutter having a circular saw.

4. The treatment apparatus according to claim 3, wherein the plurality of cutting parts is spaced apart from each other and pass along a cutting path.

5. The treatment apparatus according to claim 4, wherein each of the cutting parts comprises a first cutter and a second cutter, and the first and second cutters are installed so as to have the same central axis and such that circular surfaces of the respective first and second cutters face each other and cutting paths of the respective first and second cutters are parallel to each other.

6. The treatment apparatus according to claim 4, wherein each of the cutting parts comprises first and second cutters having the same cutting path, and the second cutter repeatedly passes along the cutting path along which the first cutter passes.

7. The treatment apparatus according to claim 6, wherein the first cutter has a greater cutting width (t) than a cutting width ($t_1$) of the second cutter, the first cutter has a cutting depth from the outer peripheral surface of the body to a preset cutting depth (H), and the second cutter has a cutting depth from the preset cutting depth (H) to an inner peripheral surface of the body.

8. The treatment apparatus according to claim 7, wherein the driving part drives the cutting part in a first direction in which the cutting part rotates, in a second direction in which the cutting part is moved toward the outer peripheral surface of the body, and in a third direction in which the cutting part is spaced apart from the body.

9. The treatment apparatus according to claim 1, wherein the rotation frame is infinitely rotated when the electric power is supplied thereto through the electric supply module, and the driving part and the frame driving part are controlled in a wireless manner.

10. The treatment apparatus according to claim 1, further comprising an injection unit installed on the rotation frame, and the injection unit comprises an injection nozzle for spraying cutting oil in a mist form, a pressure supply part supplied with the electric power from the electric supply module so as to provide an injection pressure of the cutting oil, and an oil tank for storing the cutting oil.

11. The treatment apparatus according to claim 1, further comprising a movable installation jig which supports the support frame at a lower portion and is separated when the support frame is moved and then coupled to the body.

12. A treatment method for a waste steam generator, the method comprising:
   providing a treatment apparatus including a cutting part for cutting a body of the waste steam generator, a driving part for driving the cutting part, a support frame for supporting the cutting part and the driving part, wherein the support frame is coupled to an outer peripheral surface of the body of the waste steam generator in a divided state, and the cutting part is driven and cuts the body in a state in which the support frame is coupled to the outer peripheral surface of the body, wherein the support frame comprises a plurality of divided portions, a coupling part for mutually coupling the plurality of divided portions in a state in which the divided portions are coupled to the cylindrical outer peripheral surface of the body in four locations, wherein the support frame comprises a main frame having a cylindrical shape in a state in which the support frame is coupled to the outer peripheral surface of the body, a rotation frame rotatably coupled to one surface of the main frame so that the cutting part and the driving part are mounted to the rotation frame, and a frame driving part for rotatably driving the rotation frame, and an electric supply module for supplying electric power to the driving part and the frame driving part, the electric supply module comprises an electric power supply rail coupled to the other surface of the main frame, a rail connection part maintained and rotated in a state of coming into contact with the electric power supply rail when the rotation frame is stopped and rotated, and a connection part connecting the rail connection part to the rotation frame, and the driving part and the frame driving part are electrically connected to the electric supply module through the rotation frame;

applying electric power from the external electric source;
supplying the applied electric power to the driving part for driving the cutting part and the frame driving part for driving the rotation frame through the electric supply module; and
driving the cutting part mounted to the rotation frame in a state in which the rotation frame rotates to cut the body of the waste steam generator.

13. The treatment method according to claim 12, wherein the driving part and the frame driving part are controlled in a wireless manner by an external control center.

14. An installation method of a treatment apparatus for a waste steam generator, wherein the treatment apparatus comprises a cutting part for cutting a body of a waste steam generator, a driving part for driving the cutting part, a support frame for supporting the cutting part and the driving part, wherein the support frame is coupled to an outer peripheral surface of the body of the waste steam generator in a divided state, and the cutting part is driven and cuts the body in a state in which the support frame is coupled to the outer peripheral surface of the body, wherein the support frame comprises a plurality of divided portions, a coupling part for mutually coupling the plurality of divided portions in a state in which the divided portions are coupled to the cylindrical outer peripheral surface of the body in four locations, wherein the support frame comprises a main frame having a cylindrical shape in a state in which the support frame is coupled to the outer peripheral surface of the body, a rotation frame rotatably coupled to one surface of the main frame so that the cutting part and the driving part are mounted to the rotation frame, and a frame driving part for rotatably driving the rotation frame, and an electric supply module for supplying electric power to the driving part and the frame driving part, the electric supply module comprises an electric power supply rail coupled to the other surface of the main frame, a rail connection part maintained and rotated in a state of coming into contact with the electric power supply rail when the rotation frame is stopped and rotated, and a connection part connecting the rail connection part to the rotation frame, and the driving part and the frame driving part are electrically connected to the electric supply module through the rotation frame, the method comprising:
transferring the plurality of divided portions of the support frames such that the divided portions are adjacent to the body of the waste steam generator;
installing the divided portions on the outer peripheral surface of the body of the waste steam generator;
coupling the divided portions to each other so as to be one cylindrical support frame by interconnecting the divided support frames; and
connecting the electric supply module to the external electric source in a state in which the divided portions are coupled to each other.

15. The installation method according to claim 14, wherein the support frame is divided into four portions, two of the four portions are coupled toward the outer peripheral surface of the body from an upper portion of the body, and the other two are coupled toward the outer peripheral surface of the body from a lower portion of the body.

16. The installation method according to claim 15, wherein the divided portions are transferred by an installation jig, and the installation jig is separated after the divided portions are connected to each other to form one support frame.

* * * * *